United States Patent
Jung

(10) Patent No.: US 6,518,795 B1
(45) Date of Patent: Feb. 11, 2003

(54) DESIGN SIMPLICITY OF VERY HIGH-SPEED SEMICONDUCTOR DEVICE

(75) Inventor: Chang Ho Jung, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/882,977

(22) Filed: Jun. 15, 2001

(51) Int. Cl.[7] ............... H03K 19/00; H03K 3/289
(52) U.S. Cl. ............. 326/93; 326/113; 327/202; 327/298
(58) Field of Search ............ 326/93, 82, 46, 326/113; 327/212, 298, 202

(56) References Cited

U.S. PATENT DOCUMENTS 5,619,157 A * 4/1997 Kumata et al. ............. 327/203

* cited by examiner

Primary Examiner—Daniel Chang
(74) Attorney, Agent, or Firm—Suiter & Associates PC

(57) ABSTRACT

The present invention discloses a novel method and system for accessing a semiconductor device at multiple operating speeds. The novel method and system of the present invention allows access to a semiconductor device by a pipeline circuit in which modification of the pipeline circuitry is not required to achieve multiple operating speeds. An example of the invention may be the utilization of an internal clock to control internal pipeline which may allow adjustment of an effective operating speed of a semiconductor device.

11 Claims, 3 Drawing Sheets

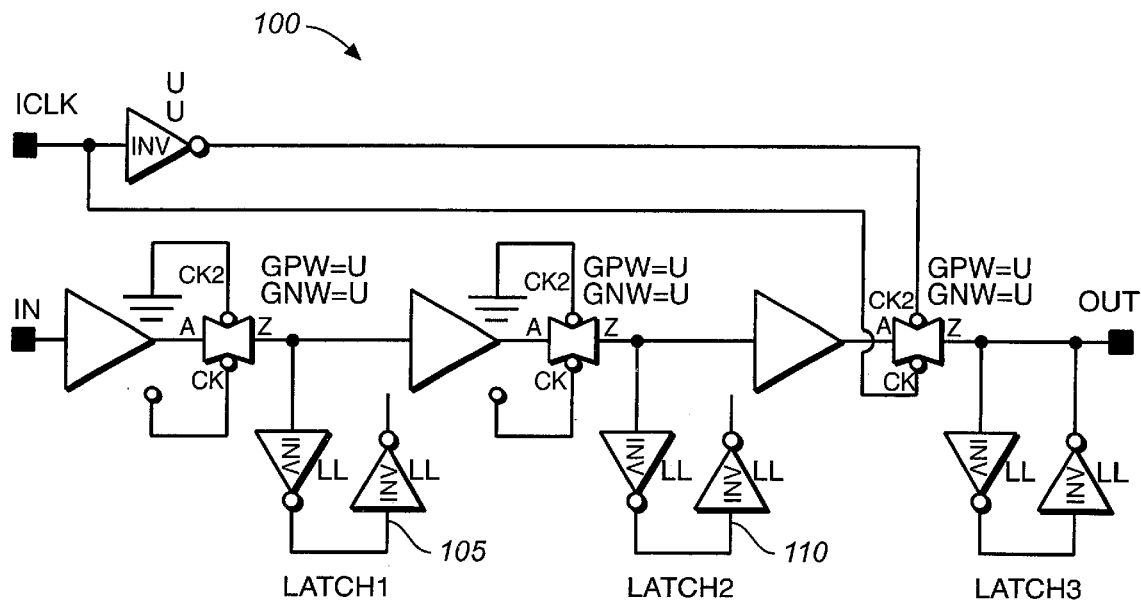
FIG._1
*(PRIOR ART)*
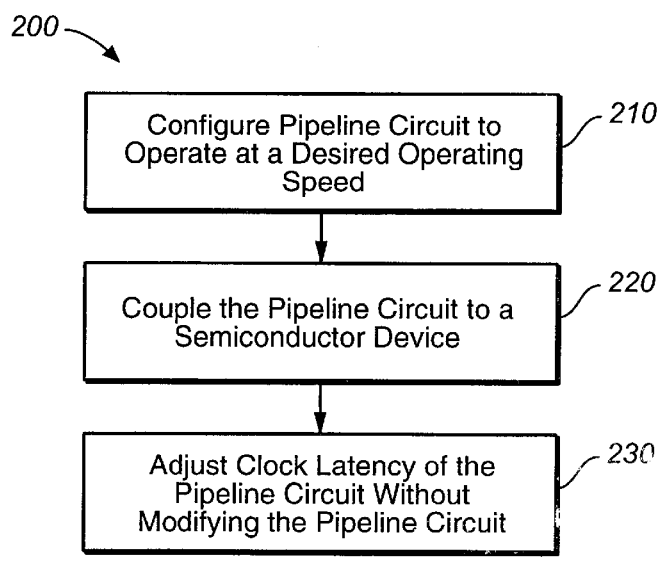
FIG._2

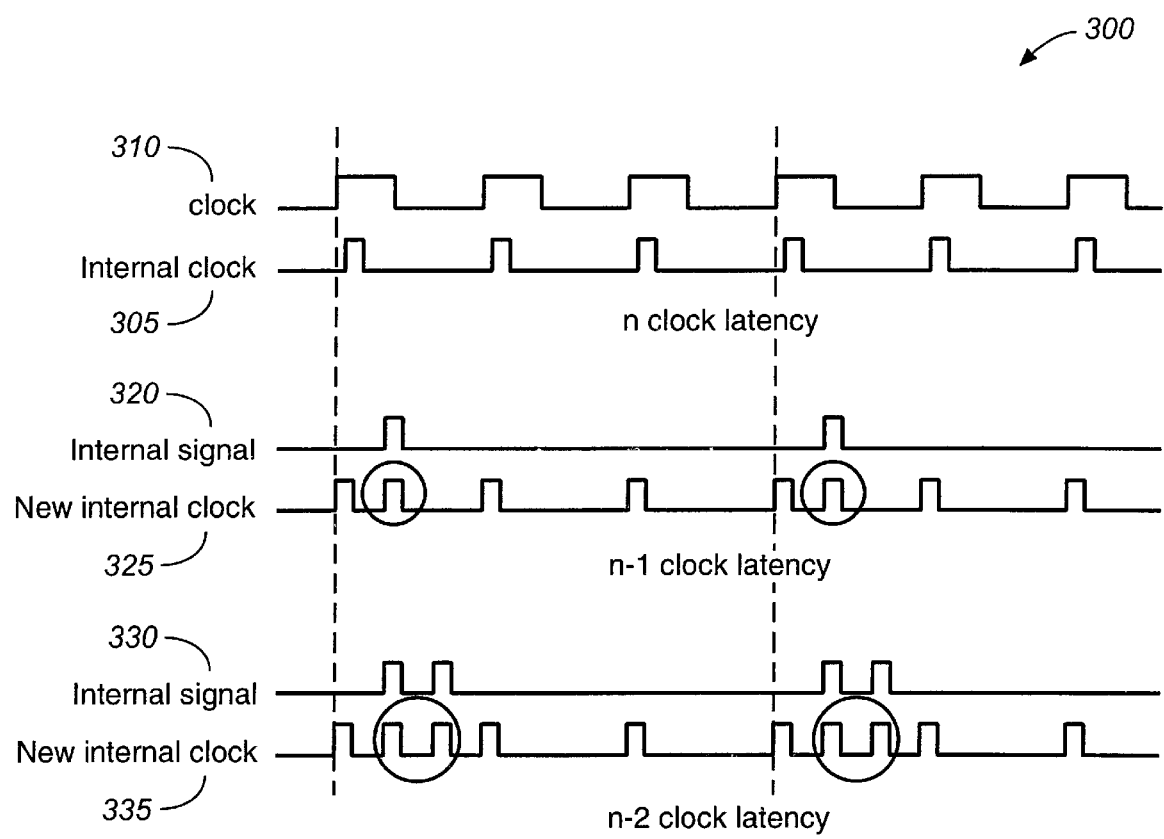
FIG._3

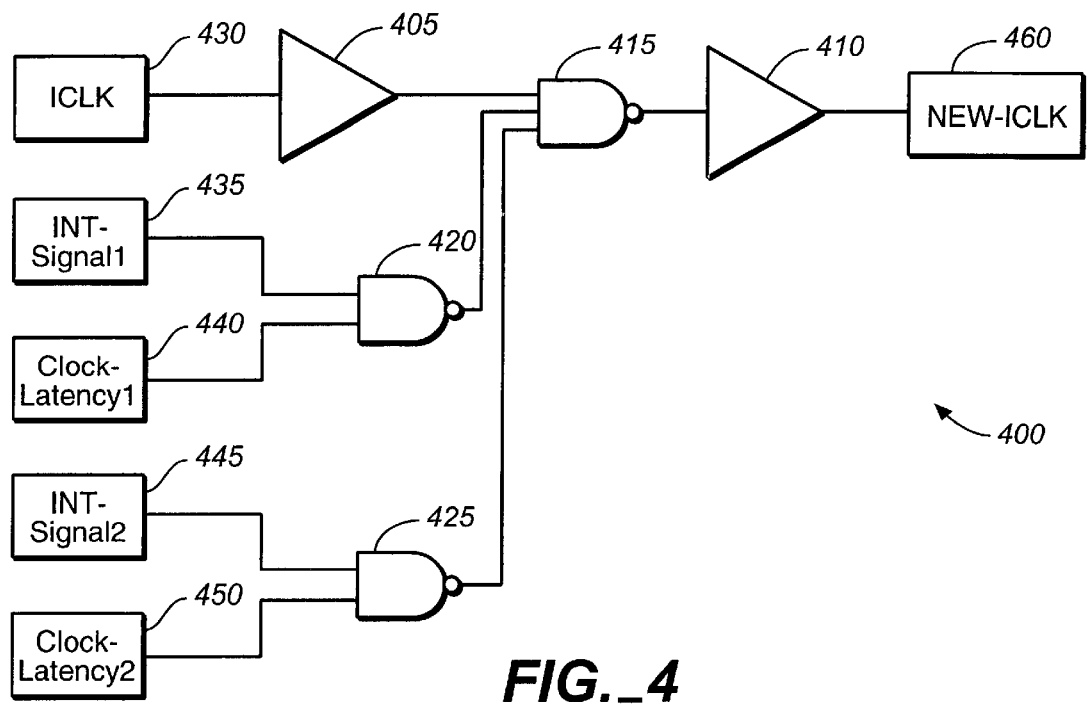
FIG. _4
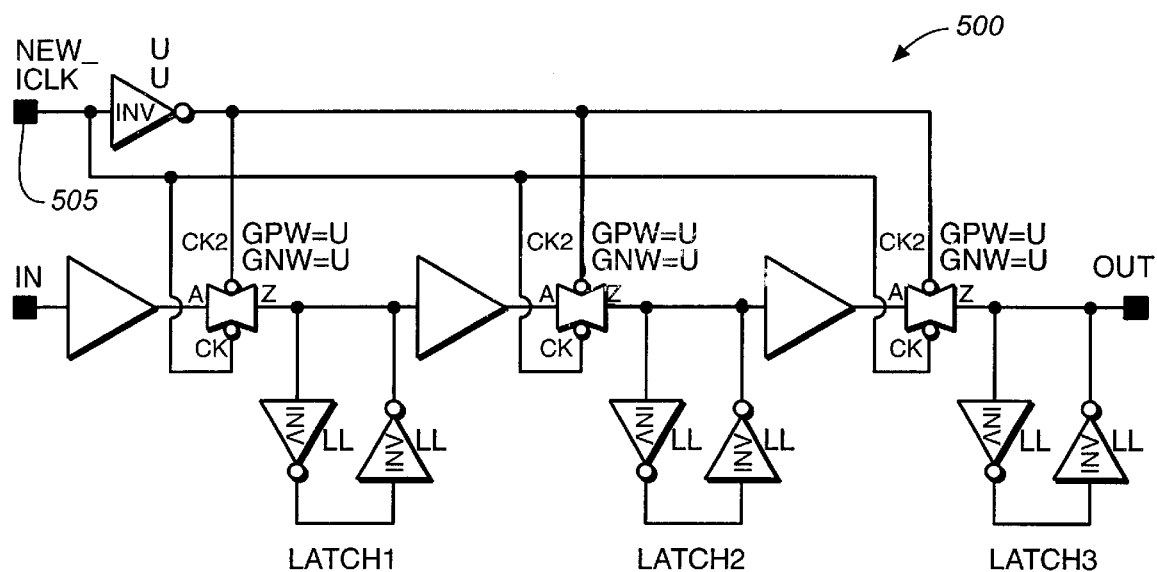
FIG. _5

DESIGN SIMPLICITY OF VERY HIGH-SPEED SEMICONDUCTOR DEVICE

FIELD OF THE INVENTION

The present invention relates generally high-speed semiconductor devices and more specifically to a method and system for accessing a semiconductor device at multiple operating speeds.

BACKGROUND OF THE INVENTION

As it is the general trend to design and manufacture semiconductor devices that may operate at high speeds, high-speed semiconductor devices are becoming extremely prevalent in various applications. However, in some applications it is beneficial for a semiconductor device to operate at slower speeds than the typical operating speed of high-speed semiconductor devices. It is well known in the art to utilize a pipeline circuit to access data as a parallel activation according to the clock signal. In order to slow the effective operating speed of the semiconductor device, the clock latency of the semiconductor device may be reduced.

Reducing the clock latency of the semiconductor device has been accomplished by reducing the internal number of pipeline stages of the pipeline circuit. External mode changes are required to reduce the internal number of pipeline stages. Furthermore, reducing the clock latency may be restricted at various frequencies as clock periods of unused pipeline stages must match the original pipeline delay. Consequently, an improved system and method for accessing a semiconductor device at multiple operating speeds is required.

SUMMARY OF THE INVENTION

Accordingly, the present invention is directed to a novel system and method for accessing semiconductor devices at multiple operating speeds. In an embodiment of the present invention, access to a semiconductor device may be accommodated by a pipeline circuit configured to operate at a first operating speed while still providing access to the semiconductor device at multiple operating speeds without modification to the pipeline circuit. One example of the invention may be the utilization of an internal clock to control internal pipeline stages which may allow adjustment of an effective operating speed of a semiconductor device.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 1 depicts an embodiment of a pipeline circuit designed to allow operation of a high-speed semiconductor device at a lower speed known to the art;

FIG. 2 depicts an embodiment of a process of accessing a semiconductor device at multiple operating speeds in accordance with the present invention;

FIG. 3 depicts an embodiment of utilizing an internal clock for pipeline controls to reduce clock latency in accordance with the present invention;

FIG. 4 depicts an embodiment of an internal clock generator capable of producing an internal clock for controlling clock latency in accordance with the present invention; and FIG. 5 depicts an embodiment of a pipeline for accessing data in accordance with the present invention.

DETAILED DESCRIPTION OF THE INVENTION

Reference will now be made in detail to an embodiment of the invention, examples of which are illustrated in the accompanying drawings.

Referring to FIG. 1, an embodiment of a modified one stage pipeline 100 designed to operate at a lower speed known to the art is shown. When a user desires to utilize a high-speed chip at a lower speed, the clock latency for the chip is reduced. Known to the art is the ability to reduce clock latency by reducing the internal number of pipeline stages of a pipeline circuit. The modified one stage pipeline 100 has reduced the pipeline by two stages from an original three-stage pipeline. The two stages 105, 110 have been reduced by implementing changes to the pipeline circuitry as shown in FIG. 1 compared to the unaltered stage. This may reduce the clock latency to an n–2 clock latency. However, if a user desired to reduce the clock latency in low frequency, another clock signal may be required to disable the unused pipeline stage. It is often difficult to match the clock signal of the unused pipeline stage with the original pipeline delay. This may restrict the ability of pipeline 100 to operate at various frequencies. Further, implementation of this design involves various external mode changes as shown in FIG. 1.

Referring to FIG. 2, an embodiment of a process 200 of accessing a semiconductor device at multiple operating speeds in accordance with the present invention is shown. The process may begin by configuring a pipeline circuit to operate at a desired operating speed 210. It is well known in the art to utilize pipeline circuits to access semiconductors as they may provide efficiency benefits in data transfer. Pipeline circuits operate utilizing an input signal. An input signal may be an input clock signal. A pipeline circuit has a clock latency, and in an embodiment of the invention, the clock latency of the pipeline circuit may be configured to be approximately equal to the highest clock rate of the semiconductor device. Thus, the desired operating speed, as an example, may be the highest clock rate of the semiconductor device. This may allow the pipeline circuit to provide efficient access to the semiconductor device at the device's highest operating speed.

Data access to the semiconductor device may be achieved by coupling the pipeline circuit to the semiconductor device 220. An advantageous aspect of the present invention is the ability to access the semiconductor device at multiple operating speeds. In some applications, it is desired that access to a semiconductor device utilize an operating speed which may be less than the highest clock rate of the semiconductor device. Access to a semiconductor device at slower operating speeds may be achieved by reducing the clock latency of the pipeline circuit. In an embodiment of the present invention, the clock latency of the pipeline circuit may be adjusted without modifying the pipeline circuit. This may be beneficial as no external modifications to the pipeline circuit may be required to achieve access to a semiconductor device at multiple operating speeds.

As pipeline circuits operate utilizing an input signal, one example of adjusting clock latency without modifying the pipeline circuit involves manipulation of an input signal of the pipeline circuit. Manipulation of an input signal may include the addition of one or more internal signals along with doubling and tripling of the input signal.

Referring now to FIG. 3, an embodiment of a method utilizing an internal clock 300 for pipeline controls to reduce clock latency in accordance with the present invention is shown. Generally an internal clock signal 305 is generated to match the clock signal 310 in order to operate a high-speed semiconductor device at higher operating speeds. If a user desires to reduce the operating speed of the high-speed semiconductor device, clock latency may be reduced by altering the internal clock for pipeline control in accordance with the present invention. For example, in order to achieve a n–1 clock latency, an internal signal 320 may be added to internal clock signal 305 to generate a new internal clock 325. In another embodiment of the present invention, n–2 clock latency may be generated by adding two internal signals 330 with internal clock 305 to produce a new internal clock 335.

Referring now to FIG. 4, an embodiment of an internal clock generator 400 capable of producing an internal clock for controlling clock latency in accordance with the present invention is shown. Internal clock generator 400 may be utilized to generate new internal clock signals 325 and 335 as shown in FIG. 3 to produce n–1 and n–2 clock latency in accordance with the present invention. Internal clock generator 400 may include a first buffer 405, a second buffer 410, and a first, second, and third Nand gates 415, 420 and 425 respectively. A first buffer may receive an internal clock signal 430 and output to a first Nand gate 415. First Nand gate 415 may receive the output from second and third Nand gates 420, 425 as other inputs. Second Nand gate 420 may receive an internal signal1 435 and clock latency1 440 as inputs while third Nand gate 425 may receive internal signal2 445 and clock latency2 450 as inputs. The output of first Nand gate 415 may be supplied to second buffer 410. The output of second buffer 410 may be the new internal clock signal 460. Depending upon the desired latency a user may select, new internal clock 460 may have a latency of n, n–1, or n–2.

Referring to now to FIG. 5, an embodiment of a pipeline 500 for accessing data in accordance with the present invention is shown. Pipeline 500 may be configured to operate at first operating speed of a semiconductor device. In a preferred embodiment, the first operating speed may be approximately equal to the highest clock rate of the semiconductor device. The new internal signal 460 supplied by internal clock generator 400 of FIG. 4 may be supplied to pipeline 500 of the present invention at node 505. This may allow a user to access a semiconductor device at multiple operating speeds. For example, a semiconductor device coupled to pipeline 500 of the present invention may operate at a n, n–1, and n–2 clock latency without altering or modifying pipeline 500 of the present invention. An advantage of the present invention is the ability to quickly adjust the clock latency of the pipeline circuitry. For example, adjustment of the clock latency of the pipeline 500 may occur upon activating of an enable signal from the semiconductor device. The controlling factor of the operating speed may be the clock latency of the new internal clock signal 460 as generated by internal clock generator 400 of FIG. 4. As such, a user may easily control the effective operating speed of a high-speed semiconductor device by providing a desired input signal to pipeline 500. The desired input signal may be generated, in one embodiment, by internal clock generator 400 of FIG. 4.

While manipulation of an input signal may be one method of providing multiple operating speed access to a semiconductor device, the present invention is not limited to this method. Other methods of altering the clock latency of a pipeline circuit without modifying the pipeline circuit may exist to one of ordinary skill without departing from the scope and spirit of the present invention.

Further, other methods of altering the input signal to the pipeline circuit may exist to a person of ordinary skill in the art to achieve a change in clock latency without departing from the scope and spirit of the present invention. Addition of at least one signal, multiplication of an input signal, and the like being only embodiments of the present invention.

Further, it is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of accessing a semiconductor device at multiple operating speeds, comprising:
    (a) coupling of a pipeline circuit to a semiconductor device, said pipeline circuit operating in accordance with an input signal providing parallel access to said semiconductor device; and
    (b) adjusting a clock latency of said pipeline circuit without modification to said pipeline circuit; wherein an operating speed access to said semiconductor device is dependent upon said clock latency of said pipeline circuit, said pipeline circuit being configured to operate at an optimal clock latency for a first operating speed of said semiconductor device approximately equal to a highest clock rate of said semiconductor device.

2. The method as claimed in claim 1, wherein said adjusting of said clock latency is controlled via manipulation of said input clock signal.

3. The method as claimed in claim 2, wherein said operating speed access to said semiconductor device is decreased by an addition of at least one internal signal to said input signal.

4. The method as claimed in claim 2, wherein said operating speed access to said semiconductor device is decreased by multiplication of said input signal.

5. The method as claimed in claim 1, wherein said adjustment of said clock latency is capable of occurring upon activating of an enable signal from said semiconductor device.

6. A system for accessing a semiconductor device at multiple operating speeds, comprising:
    (a) means for accessing a semiconductor device, said accessing means operating in accordance with an input clock signal providing parallel access to said semiconductor device; and
    (b) means for adjusting a clock latency of said accessing means without modification to said accessing means; wherein an operating speed access to said semiconductor device is dependent upon said clock latency of said accessing means, said accessing means being configured to operate at an optimal clock latency for a first operating speed of said semiconductor device approximately equal to a highest clock rate of said semiconductor device.

7. The system as claimed in claim 6, wherein said adjusting means is capable of manipulating said input signal.

8. A method of accessing a semiconductor device at multiple operating speeds, comprising:
   (a) coupling of a multiple stage pipeline circuit to a semiconductor device, said pipeline circuit operating in accordance with an input signal providing parallel access to said semiconductor device; and
   (b) altering said input signal to adjust a clock latency of said pipeline circuit, wherein an operating speed access to said semiconductor device is dependent upon said clock latency of said pipeline circuit, said pipeline circuit being configured to operate at an optimal clock latency for a first operating speed of said semiconductor device approximately equal to a highest clock rate of said semiconductor device.

9. The method as claimed in claim 8, wherein said operating speed access to said semiconductor device is decreased by an addition of at least one internal signal to said input signal.

10. The method as claimed in claim 8, wherein said operating speed access to said semiconductor device is decreased by multiplication of said input signal.

11. The method as claimed in claim 8, wherein said adjustment of said clock latency is capable of occurring upon activating of an enable signal from said semiconductor device.

* * * * *